Patented Sept. 5, 1939

2,172,242

UNITED STATES PATENT OFFICE 2,172,242

PREPARATION OF CELLULOSE ETHERS

Charles R. Fordyce and Joseph Gail Stampfli, Rochester, N. Y., assignors to Eastman Kodak Company, Rochester, N. Y., a corporation of New Jersey No Drawing. Application June 23, 1937, Serial No. 149,926

8 Claims. (Cl. 260—231)

This application relates to the etherification of cellulose in which an acetal is used as the solvent therein.

Ordinarily, cellulose ethers are prepared by treating the cellulose with alkali and then contacting it with an ethylating agent without altering the physical structure of the cellulose. In the making of cellulose ethers in which the ether is dissolved in the reaction mixture, the action appears to be more uniform and the products more homogeneous than those prepared without alteration of the physical structure of the original cellulose.

Some of the properties which are desirable in a solvent for use in an etherification are;

1. A good solvent for the cellulose ether at the etherification temperature.

2. A solvent for the alkyl chloride and a poor solvent for alkali.

3. It should be sufficiently soluble in water to permit precipitating the reaction mixture.

4. It should not react with alkali or alkyl chloride.

Solvents have been suggested in the prior art for use in etherification processes, however, these solvents were of the nature of hydrocarbons, such as benzene, and because of their insolubility in water prevented precipitation of the reaction mixture therein. Other solvents have also been suggested, such as the lower alcohols and the ketones. However, these solvents are unsuitable as they either react with the etherifying reagents or decompose in the ethylating bath. These solvents also have a tendency to remove alkali from the alkali cellulose.

We have found that the acetals, both cyclic and straight aliphatic compounds, either substituted or unsubstituted, are excellent solvents for the etherification of cellulose especially when the percentage of oxygen in them is rather large. A large number of the acetals are either completely soluble in water or are sufficiently soluble so that an ether which has been dissolved by them can be precipitated with water.

It has generally been supposed that the acetals are rather unstable and, therefore, it would be expected that they would decompose under the vigorous conditions necessary for the formation of cellulose ethers. We have found to the contarary, namely, that when acetals are used as solvents in the preparation of cellulose ethers, they do not decompose but instead give good dopes which can be precipitated directly in water to give ethers having good physical properties.

The cellulose ethers are prepared in accordance with our invention by first soaking the cellulose in sodium hydroxide, then removing the excess liquid therefrom, such as by centrifuging, and treating in an autoclave with a mixture of an etherifying agent, such as ethyl chloride and an acetal. The dope formed is then precipitated in water and the product is washed and dried. The following examples illustrate processes in which our invention is embodied:

Example I 100 grams of refined sulfite wood pulp was soaked in an excess of aqueous sodium hydroxide of 50% concentration for 4 hours. It was then centrifuged, broken up and placed in an autoclave containing a mixture of 750 cc. of ethylene formal and 750 cc. of ethyl chloride. The mass was heated for 6 hours at 120° C. A heavy dope was formed which was thinned with a little iso-propyl alcohol, precipitated in water, washed and dried. The resulting ethyl cellulose had an ethoxyl content of 42.7% and gave films of good strength and flexibility when coated out from its solution in ethylene chloride-methyl alcohol (9:1).

Example II 100 grams of cellulose was soaked for 4 hours in an excess of 50% sodium hydroxide. The mass was then centrifuged and the alkali cellulose was broken up and placed in an autoclave containing a mixture of 750 cc. of ethylene formal and 750 cc. of n-propyl chloride. The reaction mixture was heated for 6 hours at 130° C. A heavy dope formed which was thinned with iso-propyl alcohol and precipitated in water. The resulting product was washed and dried. The propyl cellulose formed contained 27.4% propoxyl.

Example III 100 grams of refined sulfite wood pulp was soaked in a large amount of 50% NaOH. The excess liquid was then centrifuged off and the mass was broken up and mixed with 200 grams of powdered NaOH. The alkali cellulose was then placed in an autoclave containing 750 cc. of ethylene formal and 750 cc. of ethyl chloride. The mass was maintained at 130° C. for 8 hours. A heavy dope formed which was thinned with iso-propyl alcohol and precipitated in water. The product was washed and dried and was found to be an ethyl cellulose having an ethoxyl content of 49.6%. Films prepared from this ether exhibited excellent clarity.

Example IV 150 grams of refined sulfite wood pulp was soaked in an excess of 50% sodium hydroxide for 4 hours. The mass was then centrifuged and the alkali cellulose was broken up and placed in an autoclave containing a mixture of 1000 cc. of ethylene formal and 600 cc. of ethyl chloride. The mass was maintained at 120° C. for 7 hours forming a heavy alkaline dope which was thinned with acetic acid and precipitated in warm water. The resulting product was washed with water and dried. The ethyl cellulose produced contained 44.1% ethoxyl.

Example V 150 grams of refined cotton linters was soaked in an excess of 50% sodium hydroxide for 4 hours. The mass was then centrifuged and the alkali cellulose was broken up, placed in an autoclave and covered with a mixture of 750 cc. of propylene formal and 750 cc. of ethyl chloride. The mass was heated for 6 hours at 120° C. and a very heavy alkaline dope formed which was worked up, as described in the preceding example. The ethyl cellulose formed contained 41.4% ethoxyl.

Example VI

Alkali cellulose was prepared, as described in the preceding example, and reacted with 750 cc. of ethyl chloride in the presence of 750 cc. of methylal, as a solvent, for 4 hours at 110° C. after which it was maintained at 125° for 5 hours. A heavy dope was obtained which was worked up, as described in the preceding examples. The ethyl cellulose formed contained 43.4% ethoxyl.

Example VII

Alkali cellulose was prepared from 150 grams of cotton linters, as described in Example V. The broken up material was then mixed with 750 cc. of dimethyl acetal and 750 cc. of ethyl chloride. It was heated for 4 hours at 110° C. and then for 5 hours at 125°. A heavy alkaline dope formed which was worked up, as described above. An ethyl cellulose containing 38.1% ethoxyl was obtained.

Example VIII 140 grams of refined wood pulp was soaked in 50% alkali for 4 hours. The alkali cellulose was then obtained therefrom by centrifuging and it was broken up and placed in an autoclave together with a mixture of 300 cc. of ethyl chloride and 900 cc. of ethylene formal. The mass was maintained at 110° C. for 18 hours. The ethyl cellulose formed was separated from the reaction mixture in the same manner as described in the preceding examples. This product contained 39.6% ethoxyl.

Example IX

Alkali cellulose was prepared, as described above, from cotton linters having a viscosity of 8 sec. This product was then reacted with 750 cc. of ethyl chloride and 750 cc. of ethylal, as the solvent. The ethyl cellulose formed was separated from the reaction mixture and was found to contain 39.6% ethoxyl.

It is preferred that the cellulose employed as the starting material have a cuprammonium viscosity of at least 20 centipoises and that the reaction be not prolonged to the time when the mixture becomes acid. The starting material may be refined wood pulp, cotton linters or any other cellulose of the type employed for preparing cellulose derivatives providing it has the viscosity specified. The proportions of ethyl chloride and solvent may also be somewhat varied without departing from the scope of our invention. For instance, the amount of ethyl chloride may be less than that given in the examples.

Other acetals than those mentioned are suitable for use. For instance, straight chain acetals, may be employed, such as beta-methoxy propionaldehyde dimethyl acetal, while various other cyclic acetals than ethylene formal may be employed.

As pointed out in our application Serial No. 125,644 it is preferred that the products prepared have a high viscosity in order to obtain good films therefrom. This result is obtained by using a cellulose for a starting material having a viscosity of at least 20 centipoises and carrying out the reaction only for a time which will not cause the etherification mixture to become acidic.

We claim:

1. A process for preparing cellulose ethers which comprises etherifying cellulose having a viscosity of at least 20 centipoises with a bath containing an acetal so as to cause dissolution of the ether formed therein and terminating the reaction before the reaction mixture becomes acidic.

2. A process for preparing cellulose ethers which comprises soaking cellulose in a water solution of caustic alkali having a concentration of at least 40%, removing the excess alkali therefrom by pressure and then etherifying the cellulose with a mixture of ethyl chloride and an acetal so as to cause dissolution of the ether formed therein and terminating the reaction before the reaction mixture becomes acidic.

3. A process for preparing cellulose ethers which comprises soaking cellulose in a water solution of caustic alkali having a concentration of at least 40%, removing the excess alkali therefrom by pressure and then etherifying the cellulose with a mixture of ethyl chloride and a cyclic acetal so as to cause dissolution of the ether formed therein and terminating the reaction before the reaction mixture becomes acidic.

4. A process for preparing cellulose ethers which comprises soaking cellulose in a water solution of caustic alkali having a concentration of at least 40%, removing the excess alkali therefrom by pressure and then etherifying the cellulose with a mixture of ethyl chloride and ethylene formal as the solvent therein and terminating the reaction before the reaction mixture becomes acidic.

5. A process for preparing cellulose ethers which comprises soaking cellulose in a water solution of caustic alkali having a concentration of at least 40%, removing the excess alkali therefrom by pressure and then etherfying the cellulose with a mixture of ethyl chloride and ethylal as the solvent therein and terminating the reaction before the reaction mixture becomes acidic.

6. A process for preparing cellulose ethers which comprises soaking cellulose in a water solution of caustic alkali having a concentration of at least 40%, removing the excess alkali therefrom by pressure and then etherifying the cellulose with a mixture of ethyl chloride and methylal as the solvent therein and terminating the reaction before the reaction mixture becomes acidic.

7. A process for preparing ethyl cellulose which combines ethylating cellulose in a bath containing ethyl halide and an inert acetal which will cause dissolution of the ethyl cellulose formed therein.

8. A process for preparing an alkyl cellulose which comprises etherifying cellulose in a bath containing an alkayl halide and an inert acetal which will cause dissolution of the ether formed therein.

CHARLES R. FORDYCE.
JOSEPH GAIL STAMPFLI.